United States Patent [19]

Boyce et al.

[11] Patent Number: 5,478,913
[45] Date of Patent: Dec. 26, 1995

[54] MELT-PROCESSIBLE POLYIMIDES WITH HIGH TG

[75] Inventors: Richard J. Boyce, Elkton, Md.;
Thomas P. Gannett, Wilmington, Del.;
James M. Sonnett, Wilmington, Del.;
Murty S. Tanikella, Wilmington, Del.;
Brian C. Auman, Newark, Del.

[73] Assignee: E. I. Du Pont de Nemours and Company, Wilmington, Del.

[21] Appl. No.: 297,960

[22] Filed: Aug. 31, 1994

Related U.S. Application Data

[63] Continuation-in-part of Ser. No. 172,336, Dec. 22, 1993, abandoned.

[51] Int. Cl.$^6$ .............. C08G 73/10; C08G 69/26
[52] U.S. Cl. .......... 528/353; 528/125; 528/128; 528/170; 528/172; 528/173; 528/176; 528/183; 528/185; 528/188; 528/220; 528/229; 528/350; 524/600; 524/606; 428/411.1; 428/473.5

[58] Field of Search .................. 528/353, 125, 528/128, 170, 172, 173, 176, 183, 185, 188, 220, 229, 350; 524/600, 606; 428/411.1, 473.5

[56] References Cited

U.S. PATENT DOCUMENTS

| | | | |
|---|---|---|---|
| 4,576,857 | 3/1986 | Gannett et al. | 428/260 |
| 4,725,642 | 2/1988 | Gannett et al. | 524/600 |
| 4,913,759 | 4/1990 | Wright | 528/353 |
| 4,960,824 | 10/1990 | Olson et al. | 524/600 |
| 5,059,273 | 10/1991 | Boyce et al. | 428/473.5 |
| 5,177,180 | 1/1993 | Griffin et al. | 528/353 |

*Primary Examiner*—P. Hampton-Hightower

[57] ABSTRACT

Copolyimides from 1,4-bis(4-aminophenoxy)-2-phenylbenzene and m- or p-phenylene diamine with biphenyl dianhydride exhibit a high Tg and reduced melt viscosity.

8 Claims, No Drawings

MELT-PROCESSIBLE POLYIMIDES WITH HIGH TG

This is a continuation-in-part of application Ser. No. 08/172,336, filed on Dec. 22, 1993, now abandoned.

BACKGROUND OF THE INVENTION

Aromatic polyimides are well known as polymers with outstanding mechanical properties and high temperature capabilities. The extreme processing conditions and expense of these materials has limited their widespread adoption as matrix materials for structural composites. In recent years, significant efforts to develop polyimides that are economical, that exhibit a high glass transition temperature, Tg, and that are readily processable, have met with limited success.

Composite systems, designated Avimid® K (E. I. du Pont de Nemours), employing matrices based on pyromellitic dianhydride and extended ether diamines have recently been described (A. R. Wedgewood, SAMPE Tech. Conf. 24, p T385, 1992). These linear polymer matrices have very attractive mechanical properties. The polymers have high melt flows at modest processing conditions, even after full polymerization and devolatilization. Thus, these materials are compatible with composite molding processes featuring melt consolidation of devolatilized prepreg plies. Such melt processes produce inherently high quality laminates (U.S. Pat. No. 5,059,273). The dry glass transition temperatures of the neat resins from Avimid® K range from 220° to 255° C. Saturation with 80° C. water yields a wet Tg range of 190°–205° C.

The current invention provides novel polyimides which have dry/wet Tg and flow at least equivalent to Avimid® K with good thermal oxidative stability and mechanical properties. The invention also offers the potential of a more economical product by replacing some of the expensive components of the state of the art polymer with less expensive ingredients.

SUMMARY OF THE INVENTION

The present invention provides novel copolyimides that exhibit a high glass transition temperature (Tg) and consist essentially of the following recurring structural units:

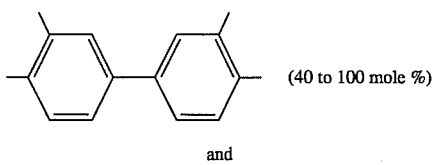

and where Z is

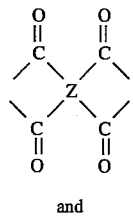 (40 to 100 mole %)

and

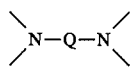 (0 to 60 mole %)

and Q is

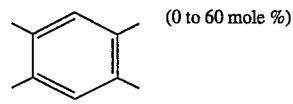 (25 to 80 mole %)

and

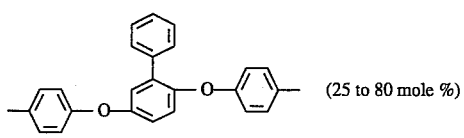 (20 to 75 mole %)

or

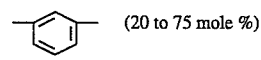 20 to 70 mole %).

Also provided are such polyimides of reduced melt viscosity having at least a 2% molar excess of amine or anhydride end groups which may bear a reactive or non-reactive end-cap.

Composites and prepreqs of such polyimides reinforced with fibrous substrates are also encompassed by the invention as well as films and fibers of the polyimides.

DETAILED DESCRIPTION OF THE INVENTION

The polymerization of 1,4-bis(4-aminophenoxy)-2-phenylbenzene (2PhAPB144) and m-phenylene diamine (MPD) or p-phenylene diamine (PPD) with biphenyl dianhydride (BPDA) proceeds readily under standard conditions. It is conveniently accomplished by adding the BPDA to a mixture of ethanol and N-methylpyrrolidone to form the diethylester diacid and then adding the mixture of diamines to form a precursor solution. The polyimide is formed from the precursor solution by heating and removal of the volatiles. The resulting resin can be ground, and under heat and pressure, formed into a desired shape. For preparation of composites, the precursor solution may be used to impregnate a fibrous reinforcing substrate and then heated to form the polyimide which can be shaped under heat and pressure. Surprisingly, the polyimides of this invention present a combination of high Tg and melt-processibility that is significantly better than closely related polyimides.

The polyimides are prepared by reacting biphenyl dianhydride and optionally pyromellitic dianhydride (PMDA) with 1,4-bis(4-aminophenoxy)-2-phenylbenzene and either p-phenylene diamine or m-phenylene diamine. Preferably a reactive or non-reactive end-capping agent is employed in the polymerization. If pyromellitic dianhydride is employed, it constitutes up to 60 mole % of the anhydride mixture with biphenyl dianhydride. If m-phenylene diamine is employed, it will constitute from 20 to 75 mole % of the diamine mixture with 1,4-bis(4-aminophenoxy)-2-phenylbenzene. If p-phenylene diamine is used, it may constitute from 20 to 70 mole % of the mixture of diamines. In place of the diamines and dianhydrides, their functional equivalents may be used as will be obvious to those skilled in the art. At least a 2 mole % stoichiometric excess of either the diamine or the dianhydride is required to assure melt processability. Preferably the imbalance should not exceed 20 mole %. The molar excess should be partially or fully end-capped with a reactive or non-reactive end-capping agent to limit molecular weight as is well known in the art. A non-reactive end-capping agent is exemplified by phthalic anhydride. Phenylethynylaniline (PEA) and Phenylethynyl phthalic anhydride (PEPA) are illustrative of reactive end-capping agents. It enables cross-linking to take place when the copolyimide is heated in the curing process. The end-capping agent is introduced with the diamine or dianhydride reactants in the precursor solution which will be used to make the polyimide.

Tests and Measurements

The glass transition temperature (Tg) of the resin is determined by standard differential scanning calorimetry (DSC) inflection point techniques using a TA Instruments 9900 system with a dual cell 912 DSC module employing a heat-up rate of 15° C. per minute.

A measure of the ease by which the resin flows, the compressive squeeze flow (F), was determined by the following procedure: A compression press, platen size 0.203 m (8 in.), or 0,305 m (12 in.), square, is preheated to the desired temperature setting. A square piece of a $5.1\times10^{-4}$ m (0.002 in.) polyimide film is placed on the lower press platen. Then, using a 0,025 m (1 in.) diameter containment ring, 1 gram of vacuum dried sample of resin powder is deposited at the center of the press platens. The ring is removed, a second piece of polyimide film is placed over the sample and the press closed immediately under 2,270 kg (5,000 pounds) of load. After 2 minutes the platens are unloaded and the pressed sample is removed. After cooling to room temperature the diameter of the resin flow disk is measured at 4 places and the average value, in meters, is squared and reported as the compressive squeeze flow.

EXAMPLE 1

This example illustrates a method for the preparation of polyimide resins of this invention. The particular procedure produces a resin composition partially end-capped with phthalic anhydride, with the remaining end groups being amine.

The first phase in producing the polyimide resin is the preparation of a precursor solution, which is accomplished according to the following procedure: A glass reaction vessel, fitted with an agitator and a condenser, is purged with dry nitrogen. To this vessel 34.88 g of anhydrous ethanol (E) and 34.88 g of N-methylpyrrolidone (NMP) are added at ambient temperature. Agitation is started and maintained throughout the remainder of the solution making process. To the agitated solvent is added 30.84 g (0.105 mole) of biphenyl dianhydride (BPDA). The mixture obtained by this addition is then heated to reflux, ca 90° C.–95° C., and maintained until the BPDA reacts to the diethylester-acid and completely dissolves. The clear solution is then cooled to 85° C. and 6.67 g (0,062 mole) of m-phenylene diamine (MPD), 22.71 g (0.061 mole) of 1,4-bis(4-aminophenoxy)-2-phenylbenzene (2PhAPB144) and 2,705 g (0.018 mole) of phthalic anhydride (PA) are added. The mixture is then held for 1.5 hours at 85° C. and the resulting clear solution is removed from the reaction vessel, placed in an air-tight container and stored until needed.

The polyimide resin is produced as follows: Precursor solution prepared as above is divided equally in two 0.127 m×0.178 m (5 in.×7 in.) aluminum pans. These pans are placed in an oven at ambient temperature. A vacuum oven setting of 0.381 to 0.508 m (15 to 20 in.) Hg is established, and a dry nitrogen bleed is maintained throughout the heating process. The oven is then heated to 100° C. and held for 1 hour, then heated to 200° C. and held for 2 hours. The resulting partially devolatilized and partially cured material is removed from the oven, cooled in a desiccator and then ground using a Waring type blender. The resulting powder is placed in an air circulating, Class A, oven and heated from ambient to 285° C. at the rate of 1° C./minute. It is held for 2 hours at 285° C. and then removed to cool in a desiccator. The resulting resin mass is then ground and stored in an air-tight container until used. The glass transition temperature (Tg) of this resin is 240° C. The compressive squeeze flow of the resin is $59\times10^{-4}$ m at 330° C.

EXAMPLE 2

Polyimides of biphenyl dianhydride (BPDA) with various diamines, singly or in pairs, were prepared by the procedure described in Example 1. The solution preparations were conducted on a scale to yield approximately 50 g of polyimide resin. The isolated resin powders were tested as in Example 1, with the exception that the squeeze flow (F) measurements in this example were carried out at 360° C. The diamines used were: m-phenylene diamine (MPD), p-phenylene diamine (PPD), 1,4-bis(4-aminophenoxy)-2-phenylbenzene (2PhAPB144), 1,4-bis(4-aminophenoxy) benzene (APB144), 1,3-bis(4-aminophenoxy) benzene (APB134) and 1,3-bis(3-aminophenoxy)benzene (APB133).

Table 1 shows the composition, glass transition temperature (Tg) and resin squeeze flow results for polyimides of various compositions. From the Tg and flow results presented in this table, it is seen that only 2PhAPB144, of all the diamines evaluated, provides compositions with either MPD or PPD which can simultaneously produce resin flow and Tg levels appropriate for consideration as a processible high temperature polyimide, i.e., $F>20\times10^{-4}$ m and $Tg>220°$ C.

The data of Table 1 shows that MPD and PPD provide polyimide compositions with 2PhAPB144 having similar resin flow behavior, however, MPD provides resins of higher Tg than does PPD which is unexpected.

TABLE 1

| Mol % Diamine 1 | Mol % Diamine 2 | Glass Transition (DSC) Tg (°C.) | Squeeze Flow @360° C. (m² × 10⁺⁴) |
|---|---|---|---|
| 25 - MPD | 75 - 2PhAPB144 | 231 | 172 |
| 50 - MPD | 50 - 2PhAPB144 | 240 | 59 |
| 75 - MPD | 25 - 2PhAPB144 | 252 | 25 |
| 25 - PPD | 75 - 2PhAPB144 | 224 | 149 |
| 50 - PPD | 50 - 2PhAPB144 | 234 | 62 |
| Comparative Resins | | | |
| 50 - PPD | 50 - MPD | 271 | 12 |
| 50 - PPD | 50 - APB133 | 193 | 62 |
| 75 - PPD | 25 - APB133 | ND | 18 |
| 25 - PPD | 75 - APB133 | 193 | 169 |
| 10 - PPD | 90 - APB133 | 185 | 260 |
| 75 - PPD | 25 - MPD | 258 | 12 |
| 90 - PPD | 10 - APB133 | ND | NM |
| 25 - PPD | 75 - PMD | ND | NM |
| 50 - MPD | 50 - APB133 | 207 | 45 |
| 100 - PPD | NONE | ND | NM |
| 100 - MPD | NONE | ND | NM |
| 90 - MPD | 10 - APB133 | ND | NM |
| 75 - MPD | 25 - APB133 | ND | 19 |
| 75 - PPD | 25 - APB134 | ND | NM |
| 90 - PPD | 10 - APB134 | ND | NM |
| 60 - MPD | 40 - APB134 | 206 | 40 |
| 60 - MPD | 40 - APB134 | 229 | 17 |
| 75 - MPD | 25 - APB134 | ND | 0 |
| 90 - MPD | 10 - APB134 | ND | 25 |
| 75 - PPD | 25 - APB144 | 223 | 0 |
| 25 - PPD | 75 - APB144 | 215 | 0 |

TABLE 1-continued

| Mol % Diamine 1 | Mol % Diamine 2 | Glass Transition (DSC) Tg (°C.) | Squeeze Flow @360° C. (m² × 10⁺⁴) |
| --- | --- | --- | --- |
| 50 - PPD | 50 - APB144 | 215 | 0 |
| 75 - MPD | 25 - APB144 | ND | NM |
| 50 - MPD | 50 - APB144 | 238 | 12 |
| 25 - MPD | 75 - APB134 | 241 | 18 |
| 100 - APB133 | NONE | 178 | 400 |
| 100 - APB144 | NONE | 183 | 172 |
| 100 - APB144 | NONE | ND | NM |
| 75 - PPD | 25 - 2PhAPB144 | 241 | 16 |

ND = no Tg detected, sample semi-crystalline
NM = sample does not flow at the 360° C. test temperature and pressure

EXAMPLE 3

This example illustrates the preparation and properties of neat resin powders and moldings based on the present invention. Use of the present invention provides materials with improved thermal oxidative stability and mechanical properties and offers the potential of a more economical product.

Polyimide precursor solutions and neat resin molding powders isolated at 285° C. were prepared using the procedures and conditions of Example 1. The recipes for each resin are shown in Table 2.

TABLE 2

| Resin # | 1 | 2 |
| --- | --- | --- |
| % anhydride excess | 5 | 12 |
| Ethanol (g) | 12.0 | 12.0 |
| NMP (g) | 90.0 | 90.0 |
| BPDA (g) | 26.3 | 26.3 |
| PMDA (g) | 6.50 | 6.50 |
| 2PhAPB144 (g) | 20.9 | 19.6 |
| MPD (g) | 6.14 | 5.76 |
| PEA (g) | 2.20 | 4.94 |

After cooling, samples of the 285° C. resin powders were further cured by placing the room temperature polymers into an air circulating oven preheated at 285° C. The oven temperature was increased at 1° C./min. to 360° C., where the temperature was held for 4 hours. After cooling in a desiccator, the glass transition temperature of each resin was determined as described in Example 1 and shown in Table 3.

Samples of the 285° C. isolated powders were further cured. Curing consisted of placing the room temperature polymers into an air circulating oven preheated to 285° C. and then heating to 330° C. at 1° C./min. Upon reaching 330° C., the resins are removed and cooled in a desiccator. The compressive squeeze flow (F) of these samples was measured at 330° C. using the procedure from Example 1. The results are shown in Table 3.

Additional characterization was conducted on plaques that were molded from the resin powders isolated at 285° C. The general molding procedure for a plaque is given below. Specific molding conditions of consolidation temperature, Tc, consolidation pressure, Tp, and final curing temperature, Tf, for each resin are given in Table 4.

General Molding Procedure:
1. Vacuum dry sieved 285° C. resin for 1 hour at 120° C.
2. Preheat a hydraulic press to Tp.
3. Add 0.032 kg of vacuum dried resin into a cold 0.176 m×0.152 m (3 in.×6 in.) mold.
4. Load mold into press and close to minimal clearance between platen and ram.
5. Insert thermocouple into pilot hole in mold.
6. Check periodically to insure that ram/platen clearance is maintained (i.e., no pressurization is occurring).
7. When mold reaches Tc, pressurize to Pc.
8. Increase mold temperature to Tf at 1° C./min.
9. Hold at temperature for t hours, then begin cool down.
10. When mold reaches 230° C., release pressure, remove mold from press and demold plaque.

The resulting 0.076 m×0.152 m×~0.0015 m (3 in.×6 in.×~0.06 in.) neat resin plaques were cut into smaller samples for thermal stability, tensile property and equilibrium water uptake determinations.

The thermal oxidative stability of the resins was assessed by measuring the weight loss of 0.025 m×0.025 m×~0.0015 m (1 in.×1 in.×~0.06 in.) samples in duplicate over 500 hours at 275° C. in an oven with dry air flowing at a rate of 700 volume changes/hour at 275° C. The samples were suspended in the oven and rotated over time to ensure uniform exposure conditions. The resulting weight losses are given in Table 3.

The tensile modulus, tensile strength and elongation at break were measured using specimens and test conditions meeting the requirements of ASTM method D-638(16.1). The mechanical properties for each of the systems are also displayed in Table 3. Each datum represents the average of 5 determinations. Higher resin modulus and strength allow the use of less material to achieve equivalent properties of a neat resin part. Improved resin modulus should also provide improved compressive properties in a composites laminate.

Finally, the equilibrium moisture uptake of the neat resins was determined by immersing 0.0254 m×0.0254 m×~0.0015 m (1.0×1.0×~0.06") samples in 80° C. water bath until a constant weight gain is achieved. The samples all reached an equilibrium weight within the first 100 hours of immersion. The immersion was continued to 341 hours. Percentage weight gain is reported in Table 3.

TABLE 3

Neat Resin Characterization Results

| Resin # | Tg (°C.) | Flow m² × 10⁺⁴ | 275° Weight Loss (%) | Modulus/ Strength/ Elongation (GPa/MPa/%) | Equilibrium Moisture Uptake (%) |
| --- | --- | --- | --- | --- | --- |
| 1 | 316 | 12 | 0.76 | 4.07/140/7.7 | 2.53 |
| 2 | 323 | 23 | 1.01 | 3.79/132/11 | 2.51 |

TABLE 4

Resin Powder Molding Conditions

| Resin # | Tp(°C.) | Tc/Pc (°C/MPa) | Tf(°C.) | t(hr) |
| --- | --- | --- | --- | --- |
| 1 | 345 | 330/13.8 | 360 | 4 |
| 2 | 345 | 330/10.3 | 360 | 4 |

EXAMPLE 4

This example illustrates that polyimide compositions of the present invention which possess addition reactive polymer endgroups may be prepared at a desired formulated molecular weight from a variety of end group stoichiometries. The chain ending groups may be entirely of the addition reactive type, or may be a mixture of the addition reactive types with any one of the following, a non-reactive endcap, an amine end group or an anhydride end group. This example illustrates that many types can be easily prepared, though some stoichiometries are preferred.

Four polyimide resins were prepared using a dianhydride molar mixture of 75/25 BPDA and PMDA, a diamine molar mixture of 50/50 MPD and 2PhAPB144 using the general procedure of Example 1, in such manner that all were produced at a formulated molecular weight obtained from a molar imbalance of total dianhydride or total diamine amounting to 8%, and that the end group stoichiometry of the four consisted of one sample with 100% endgroups derived from phenylethynlaniline (PEA) with three samples having endgroups of 50% PEA where the other 50% endgroups were derived from the dianhydrides in one case, from the diamines in another case and from phthalic anhydride (PA) endcaps in the final case.

A molded plaque from each composition was prepared according to the following procedure. Neat resin powder was dried in a vacuum oven for 1 hour at approximately 100° C. A compression press with 0.203 m (8 inch) square platens was preheated to 360° C. 0.0320 kg of vacuum dried resin powder was distributed evenly into the cavity of a 0.076 m×0.152 m (3 in.×6 in.) stainless steel mold which was at room temperature and the mold ram was inserted. All mold parts contacting the resin were treated with a suitable release agent to facilitate plaque removal after molding. The mold was then placed in the heated press, a thermocouple inserted into the mold cavity, and the platen separation closed such that there is only a few mils clearance between the ram and the upper platen. When the mold temperature reached a value of $T_c$ the press was fully closed and loaded such that a pressure of $P_c$ was brought to bear on the resin. The mold was allowed to reach 360° C. and held for 4 hours at this temperature to post cure the resin. The mold was cooled in about 0.33 hours to 230° C., the pressure released and the plaque demolded. The $T_c$ and $P_c$ values used for each composition are shown in Table 5.

The data in Table 5 shows that all compositions provide molded plaques with high $T_g$ and excellent tensile properties. However, neat resin flow behavior is such that certain compositions will be preferred for their ease of processing. The compositions based on mixed 50% PEA with either dianhydride derived or PA endgroups provides the highest resin flow behavior, which is essential for ease of processing. However, the PA capped stoichiometry is preferred due to the considerably reduced outgassing, since this outgassing can be expected to produce voids, or other defects, during molding or post molding thermal treatments such as post curing. The other two compositions, 100% PEA endgroups and 50% PEA with 50% diamine derived endgroups provide the highest level of $T_g$. The latter composition containing amine endgroups is the least attractive from a processability viewpoint based on its loss in resin flow during cure.

TABLE 5

| Endgroup | Endgroup Composition, mole % | | | |
|---|---|---|---|---|
| PEA | 100 | 50 | 50 | 50 |
| ANHYDRIDE | 0 | 50 | 0 | 0 |
| AMINE | 0 | 0 | 50 | 0 |
| PA | 0 | 0 | 0 | 50 |
| Neat Resin | | | | |
| Flow @ 330° C., m² × 10⁻⁴ | | | | |
| Original | 27 | 23 | 16 | 34 |
| Cured at 330° C. | 7 | 22 | not fused | 18 |
| Glass Transition, Tg, °C. | | | | |

TABLE 5-continued

| Endgroup | Endgroup Composition, mole % | | | |
|---|---|---|---|---|
| Original | 261 | 251 | 277 | 254 |
| Post Cured | 330 | 320 | 330 | 320 |
| Molded Plaques | | | | |
| Molding Conditions | | | | |
| $T_c$, °C. | 360 | 360 | 345 | 360 |
| $P_c$, MPa | 17.2 | 13.8 | 17.2 | 10.3 |
| Tensiles @ 23° C. | | | | |
| Strength, MPa | 100 | 68.3 | 94.4 | 91.0 |
| Modulus, GPa | 3.9 | 4.0 | 3.9 | 4.1 |
| Tg, °C. (DMA[1]) | 279 | 274 | 284 | 272 |

1-DMA (Dynamic Mechanical Analysis) storage modulus intercept method, at 10° C./min.

EXAMPLE 5

This example illustrates polyimide compositions of the present invention having the reactive end-capping agent PEPA. The polyimide precursor solutions and resin isolated at 285° C. were prepared using the procedures and conditions of Example 1. The recipes for each resin are shown in Table 6.

TABLE 6

| Resin No. | 1 | 2 |
|---|---|---|
| Ethanol (g) | 26.4 | 27.4 |
| NMP (g) | 175.0 | 164.3 |
| PMDA (g) | 61.2 | 6.50 |
| PA (g) | 3.7 | NONE |
| APB 133 | 34.3 | 31.3 |
| 2Ph APB 144 | 64.8 | 59.2 |
| PEPA | NONE | 11.7 |

A molded plaque from the composition of Table 6, Resin 1 was prepared according to the following procedure. Neat resin powder was dried in a vacuum oven for 1 h at approximately 100° C. A compression press with 841 square platens was preheated to 350° C. 0.025 kg of vacuum dried resin powder was distributed evenly into the cavity of a 76 mm×152 mm" stainless steel mold which was at room temperature. The mold ram was then inserted (all mold parts contacting the resin must be treated with a suitable release agent to facilitate plaque removal after molding). The mold was then placed in the heated press, a thermocouple inserted into the mold cavity, and the platen separation closed such that there was only a few mils clearance between the ram and the upper platen. When the mold temperature reaches 305° C.–310° C. the press platens were reset to 370° C. The mold temperature was allowed to reach 330° C. and was held at that temperature for 2 minutes. Press platen cooldown was initiated and immediately thereafter the mold was pressurized to 1.38 MPa (1.63 Mg of load for a 76 mm×152 mm molding) with several bumps. The pressure was held until the mold cools to 230° C., then released and the warm neat resin plaque was demolded.

A molded plaque from the composition of Table 6, Resin 2 was prepared according to the following procedure. Neat resin powder was dried in a vacuum oven for 1 h at approximately 100° C. A compression press with 203 mm square platens was preheated at 384° C. 0.025 kg of vacuum dried resin powder was distributed evenly into the cavity of a 76 mm×152 mm stainless steel mold which was at room temperature. The mold ram was then inserted (all mold parts contacting the resin must be treated with a suitable release agent to facilitate plaque removal after molding). The mold was then placed in the heated press, a thermocouple inserted into the mold cavity, and the platen separation closed such that there was only a few mils clearance between the ram and the upper platen. When the mold temperature reaches 360° C. it was pressurized to 13.8 MPa (16.3 Mg of load for 75 mm×152 mm mold) with bumping, and held at 360° C. under pressure for 4 hours. Platen cooling was then initiated, with the mold under pressure, and when the mold temperature cools to 230° C. the pressure was released and the neat resin plaque demolded.

EXAMPLE 6

This example illustrates a procedure for the preparation of a carbon fiber composite laminate having a polyimide resin matrix which imparts a surprising level of resistance to solvent induced stress cracking.

The first step in producing the desired laminate was the preparation of a polyimide precursor solution. Three batches of solution having the composition defined in Table 7 were prepared according to the procedure described in Example 1. The resin composition resulting from the recipe of Table 7 is 13% molar imbalance in difunctional monomers, fully capped by PEPA end-cap.

TABLE 7

RECIPE FOR A SOLVENT STRESS CRACK RESISTANT POLYIMIDE

| Ingredient | Amount, kg |
| --- | --- |
| Ethanol | 0.35625 |
| NMP | 0.52351 |
| PMDA | 0.25351 |
| BPDA | 0.63504 |
| MPD | 0.20289 |
| 2PhAPB144 | 0.69124 |
| PEPA | 0.21433 |

In the second step leading to laminates of the desired material the precursor solution produced in this example, a 64.8% cured resin solids material, was used to melt impregnate an 8 harness satin (8HS) fabric of carbon fiber T650-35 with 3000 fiber bundles per yarn, at 24" width, by commercial procedures at Fiberite, Inc.

In the final step molded laminates were prepared by autoclave molding. Prepreg layups for autoclave processing were prepared and vacuum bagged for autoclave processing by procedures well known to those familiar with the art of high temperature autoclave processing of composites. The autoclave process conditions used to produce cured and consolidated laminates are given in Table 8.

The 8 ply T-650-35, 3K-8HS composite coupons were tested for fluids resistance in Skydrol-500 at 120° C. The test procedure is described in Table 9. At the end of 500 hours, the composites developed no microcracking and were fluid resistant. 13 mole % reactive end-cap in this example provides excellent fluid resistance without sacrificing fracture toughness.

TABLE 8

AUTOCLAVE PROCESS CONDITIONS

VACUUM CONTROL

Set vacuum to 0.102 m Hg at start of run.
Raise to full (>0.736 m Hg) at 225° C., then maintain vacuum at full throughout remainder of run.
PRESSURE CONTROL TABLE 8-continued

AUTOCLAVE PROCESS CONDITIONS

No pressurization at start, 0.0 MPa gauge.
At 325° C. raise pressure over 15 minutes to 1.62 MPa,
Hold at 1.62 MPa until autoclave is cooled for laminate removal.
TEMPERATURE CONTROL Heatup from ambient temperature to 250° C. at 0.01833° C./s, then
Hold at 3 hours at 250° C., then
Heatup to 330° C. at 0.02783° C./s, then
Hold for 1 h after pressurization, then
Raise to 360° C. at 0.00925° C. min, then
Hold for 3 hours at 360° C., then
Cooldown to 230° C. at 0.00833° C./s, then
Cooldown to ambient at 0.0833° C./s, or maximum rate.

TABLE 9

TEST PROCEDURE FOR FLUID RESISTANCE

A 400 ml. reaction kettle was filled with 3000 ml of fluid and was equipped with condenser, stirrer and thermocouple with an outside temperature controller. The reaction kettle was placed in a heating mantle which was controlled by the temperature controller. The composite coupon is usually 3" long and 0.9" wide. The coupon was suspended (free hanging) into the bath so that it was completely submerged. The fluids were temperature controlled as needed and the coupons were held for various periods of time. The coupons were removed at various intervals and cut for cross-section photography. The cross-section photographs made with magnification of 25 and 50 times were then studied for microcracks. The composite was considered fluids resistant if no microcracks were observed.

EXAMPLE 7

This example illustrates the advantage to be gained in resin Tg and flow performance when the dianhydride portion of the polyimide composition uses a mixture of pyromellitic dianhydride, PMDA, with the biphenyl dianhydride, BPDA, of previous examples.

Two series of polyimide resins, one based on biphenyl dianhydride, BPDA and the other based on a 75/25 molar mixture of BPDA and pyromellitic dianhydride (PMDA), were prepared using the general procedure of Example 1. Each series employed the same molar diamine mixture of 50/50 MPD and 2PhAPB144, and covered a molar excess of diamine in the range 2% to 10% inclusive. The excess amine groups were fully capped with phthalic anhydride.

Resin powder was isolated from precursor solution per the procedure of Example 1. The resin powder was then placed, under a nitrogen blanket, into an oven preheated to 285° C. and the oven further heated to 330° C. at 1° C./min. Resin was then removed, cooled in a desiccator, and the Tg and squeeze flow determined.

Results of Tg and flow measurements in Table 6 show that, at a given monomer imbalance, compositions based on a 75/25 molar mixture of BPDA and PMDA possess both a higher Tg and greater resin flow than do the compositions where BPDA accounts for all the dianhydride. This result is surprising since raising the Tg of a resin is normally expected to decrease flow. The use of a mixture of PMDA and BPDA is expected to provide resins capable of performance at higher temperatures and with superior processability compared to those resins based only on BPDA.

TABLE 10

| Molar Imbalance, % = | 2 | 3 | 4 | 6 | 8 | 10 |
|---|---|---|---|---|---|---|
| Flow @ 330° C., cm² | | | | | | |
| 100/0 BPDA/PMDA | 12 | 16 | 17 | 20 | — | 15 |
| 75/25 BPDA/PMDA | 17 | 18 | 20 | — | 35 | — |
| Glass Transition, Tg, °C. | | | | | | |
| 100/0 BPDA/PMDA | 265 | 261 | 252 | 254 | — | 230 |
| 75/25 BPDA/PMD | 273 | 269 | 265 | — | 249 | — |

We claim:

1. A copolyimide having a glass transition temperature of from 220 to 330 degrees Celsius and melt viscosity of less than $5.0 \times 10^4$ Pa s at 360 degrees Celsius consisting essentially of the following structural units:

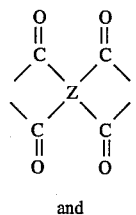

A and

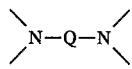

B where Z is

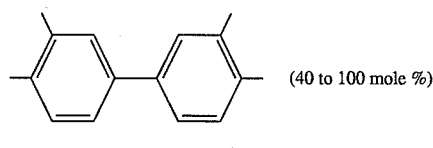 (40 to 100 mole %)

and

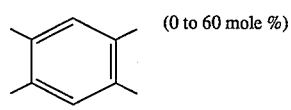 (0 to 60 mole %)

and Q is

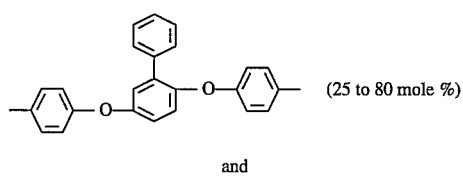 (25 to 80 mole %)

and

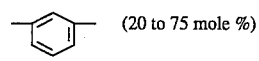 (20 to 75 mole %)

or

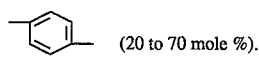 (20 to 70 mole %).

2. A process for preparing a polyimide having a glass transition temperature of from 220 to 330 degrees Celsius and melt viscosity of less than $5.0 \times 10^4$ Pa s at 360 degrees Celsius comprising:

a. forming a precursor resin solution by preparing a solution of biphenyl dianhydride as an ester/acid in a polar aprotic solvent selected from N-methylpyrrolidinone either alone or in combination with an aliphatic alcohol having from 1 to 4 carbons, optionally including pyromellitic dianhydride as an ester/acid and reacting with a mixture of diamines consisting of 1,4-bis(4-aminophenoxy)-2-phenylbenzene and either m-phenylene diamine or p-phenylene diamine, and an end-capping agent selected from the group consisting of phthalic anhydride, phenylethynylaniline and phenylethynyl phthalic anhydride, there being a molar-excess of at least 2% of either the dianhydrides or diamines, said pyromellitic dianhydride constituting 0 to 60 mole % of the dianhydride component, the m-phenylene diamine if present, constituting from 20 to 75 mole % of the diamine mixture and the p-phenylene diamine, if present, constituting from 20 to 70 mole % of the diamine mixture and b. heating the precursor solution to devolatilize and polymerize the precursor solution to the polyimide.

3. A polyimide having a glass transition temperature of from 220 to 330 degrees Celsius and melt viscosity of less than $5.0 \times 10^4$ Pa s at 360 degrees Celsius consisting essentially of

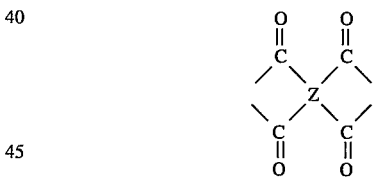

A and

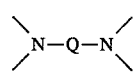

B where Z is

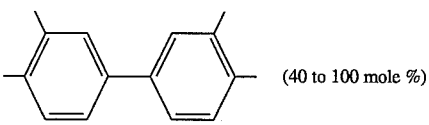 (40 to 100 mole %)

and

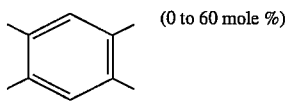 (0 to 60 mole %)

and Q is

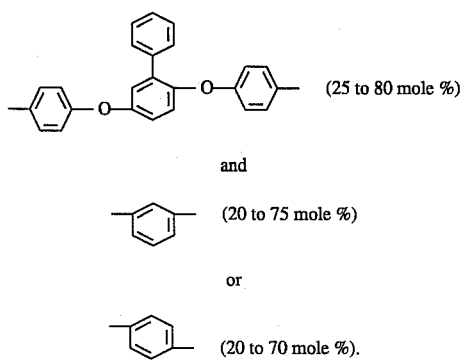

wherein said A or B units being in molar excess of at least 2% and said molar excess being partially or fully end-capped with a reactive end-capping agent selected from the group consisting of phenylethynyl phthalic anhydride and phenylethynylaniline or the non-reactive end-capping agent phthalic anhydride.

4. A composite comprising the polyimide of claims 1 or 3 reinforced with a fibrous substrate.

5. A precursor composition for preparing a solution containing the polyimide of claim 3 comprising as the dianhydride component, biphenyl dianhydride and optionally pyromellitic dianhydride, as the diamine component, 1,4-bis(4-amino-phenoxy)- 2-phenylbenzene and either m-phenylene diamine or p-phenylene diamine, and an end-capping agent selected from the group consisting of phthalic anhydride, phenylethynylaniline and phenylethynyl phthalic anhydride, there being a molar excess of at least 2% of either the dianhydride or diamine component, said pyromellitic dianhydride constituting 0 to 60 mole % of the dianhydride component, said m-phenylene diamine, if present, constituting from 20 to 75 mole % of the diamine mixture and said p-phenylene diamine, if present constituting from 20 to 70 mole % of the diamine mixture.

6. A prepreg consisting essentially of a fibrous substrate impregnated with the precursor composition of claim 5.

7. The polyimide of claim 3 wherein the reactive end-capping agent is phenylethynylaniline.

8. The polyimide of claim 3 wherein the reactive end-capping agent is phenylethynyl phthalic anhydride.

* * * * *